United States Patent [19]

Bengt

[11] Patent Number: 5,030,348

[45] Date of Patent: Jul. 9, 1991

[54] ARRANGEMENT FOR AN INLET AND OUTLET IN A ROTATING DRUM SIEVE

[75] Inventor: Möller Bengt, Partille, Sweden

[73] Assignee: Roto-Sieve AB, Gothenburg, Sweden

[21] Appl. No.: 353,635

[22] PCT Filed: Oct. 29, 1987

[86] PCT No.: PCT/SE87/00504

§ 371 Date: May 3, 1989

§ 102(e) Date: May 3, 1989

[87] PCT Pub. No.: WO88/03611

PCT Pub. Date: May 19, 1988

[30] Foreign Application Priority Data

Nov. 3, 1986 [SE] Sweden .............................. 8604695-0
Nov. 3, 1986 [SE] Sweden .............................. 8604696-8

[51] Int. Cl.5 .................................................... B01D 33/044
[52] U.S. Cl. ................................... 210/374; 209/297; 210/377; 210/394; 210/403
[58] Field of Search ................ 209/270, 284, 240, 250, 209/257, 267, 297, 298; 210/377, 394, 402–405, 784, 374, 380.1, 380.3

[56] References Cited

U.S. PATENT DOCUMENTS

| 581,354 | 4/1897 | Lapp | 210/374 |
| 658,240 | 9/1900 | Cook | 210/374 |
| 1,594,999 | 8/1926 | Carter | 210/403 |
| 1,843,791 | 2/1932 | Stadler | 209/297 |
| 2,858,942 | 11/1958 | Wentzelberger | 210/374 |
| 3,372,810 | 3/1968 | Kletschke | 210/377 |
| 4,278,543 | 7/1981 | Maniquis | 209/284 |
| 4,298,473 | 11/1981 | Wyman | 210/403 |

FOREIGN PATENT DOCUMENTS

| 803975 | 2/1981 | U.S.S.R. | 209/297 |
| 252642 | 6/1926 | United Kingdom | 210/402 |
| 2059281 | 4/1981 | United Kingdom | 210/404 |

Primary Examiner—Richard V. Fisher
Assistant Examiner—Joseph Drodge
Attorney, Agent, or Firm—Dvorak and Traub

[57] ABSTRACT

An arrangement for an inlet and an outlet in a rotating drum sieve for the separation of solid particles from a liquid mixed with particles in which a drum sieve comprises a drum casing provided with a sieve opening and a feed screw situated internally within the drum and is arranged for the supply of a liquid mixed with particles to the internal space of the drum and for the removal of sieved material from the internal space of the drum. The invention permits, amongst other things, a simple design for the sieve drum and the even and effective supply of liquid mixed with particles to the drum sieve, as well as effective and simple discharge of the drained material from the internal space of the drum. The inlet and the outlet are formed each by its own part of a commonly rotating pipe situated internally within the drum and extending through the entire drum, which pipe exhibits a number of supply openings distributed along the longitudinal sense of the pipe and displaced in relation to one another around the circumference of the pipe for the purpose of supplying a liquid mixed with particles to the internal receiving space of the drum, at the same time as the drum and the pipe are caused to rotate. A shovel-like lifting device is attached to the outlet and of the feed screw to transport sieved particles to the pipe outlet.

3 Claims, 6 Drawing Sheets

ARRANGEMENT FOR AN INLET AND OUTLET IN A ROTATING DRUM SIEVE

The present invention relates to an arrangement for an inlet and an outlet in a rotating drum sieve for the separation of solid particles from a liquid mixed with particles, which drum sieve comprises a drum casing provided with a sieve opening and a feed screw situated internally within the drum, and is arranged for the supply of a liquid mixed with particles to the internal space of the drum and for the removal of sieved material from the internal space of the drum.

The principal object of the present invention is first and foremost to make available an arrangement of the kind indicated above, which, apart from permitting the simple construction of the drum, etc., amongst other things permits the even and effective supply of liquid containing particles to the drum sieve and the effective and simple discharge of drained material from the internal space of the drum.

Said object is achieved by means of an arrangement in accordance with the present invention, which is characterized essentially in that the inlet and the outlet are formed each by its own part of a co-rotating pipe situated internally within the drum and extending through the entire drum, which pipe exhibits a number of supply openings distributed along the longitudinal sense of the pipe and displaced in relation to one another around the circumference of the pipe for the purpose of supplying a liquid mixed with particles to the internal receiving space of the drum, at the same time as the drum and the pipe are caused to rotate.

The invention is described below as a preferred illustrative embodiment, in conjunction with which reference is made to the drawings, in which.

Figure 1:
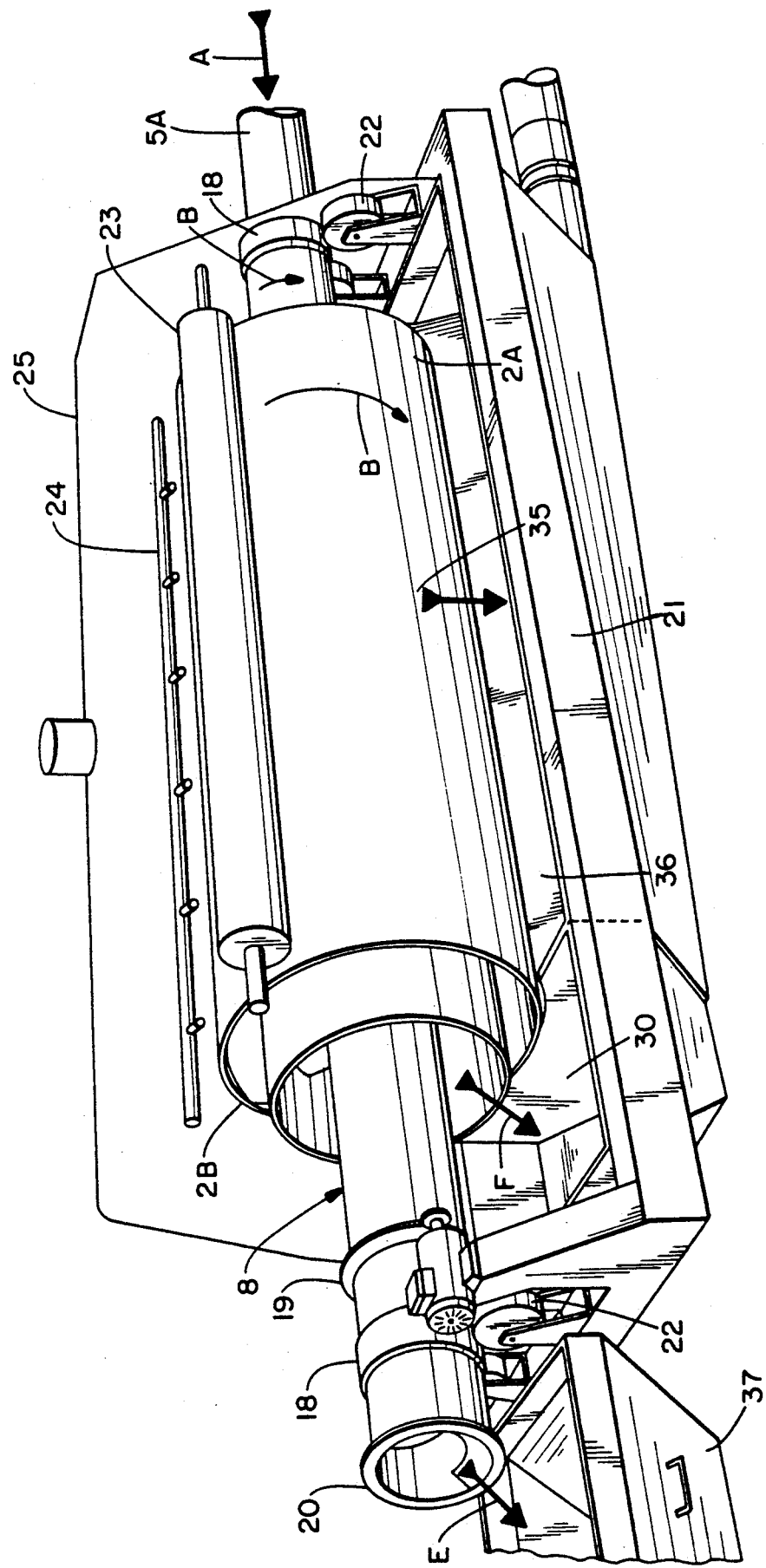
FIG. 1 shows a perspective view of a schematically illustrated drum sieve plant which contains an arrangement in accordance with the present invention.
Figure 2:
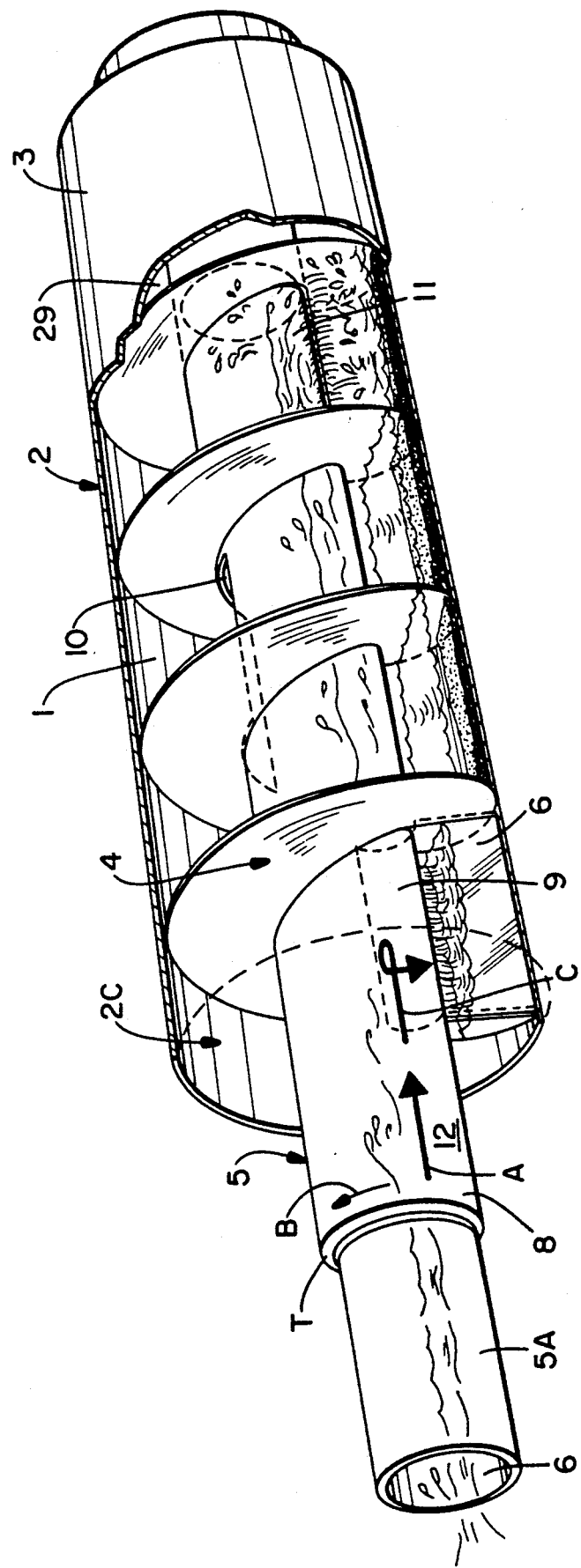
FIG. 2 shows a drum sieve in a partially sectioned view showing an inlet part arranged in a first position.
Figure 3:
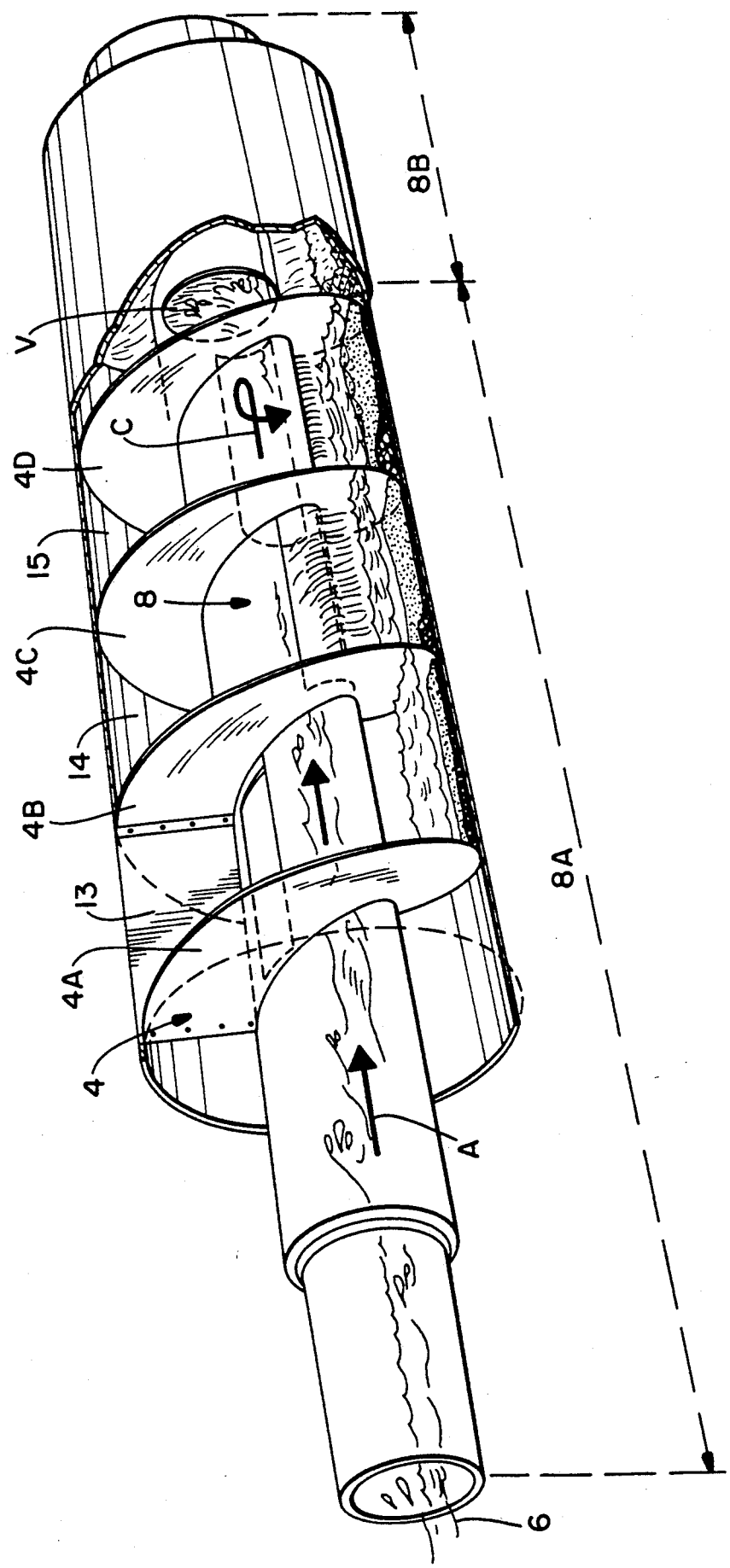
FIG. 3 shows the drum sieve and the inlet part in a second position.
Figure 4:
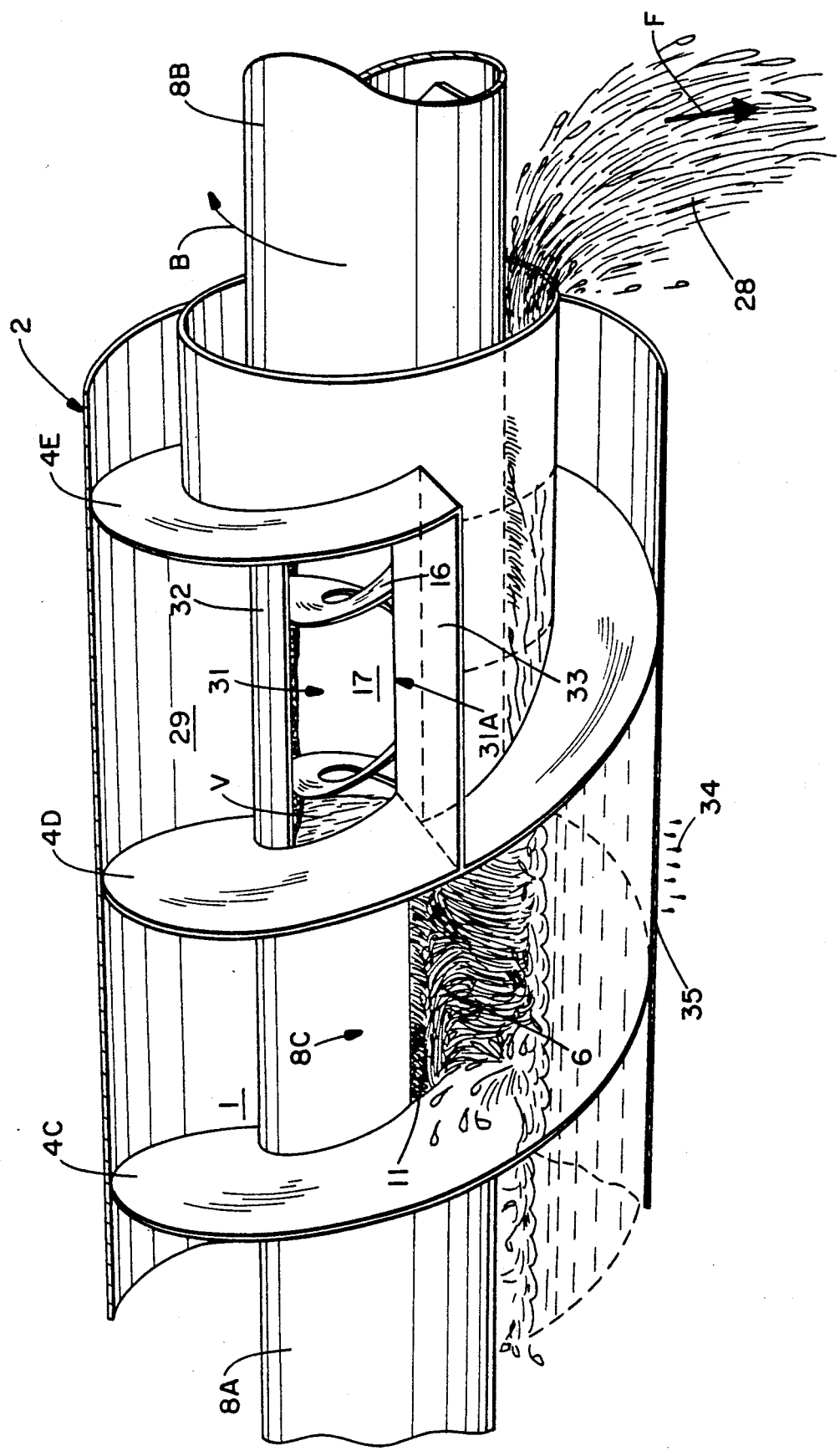
FIG. 4 shows an outlet arrangement in a drum sieve with an overflow shown here to be effective over the width.
Figure 5:
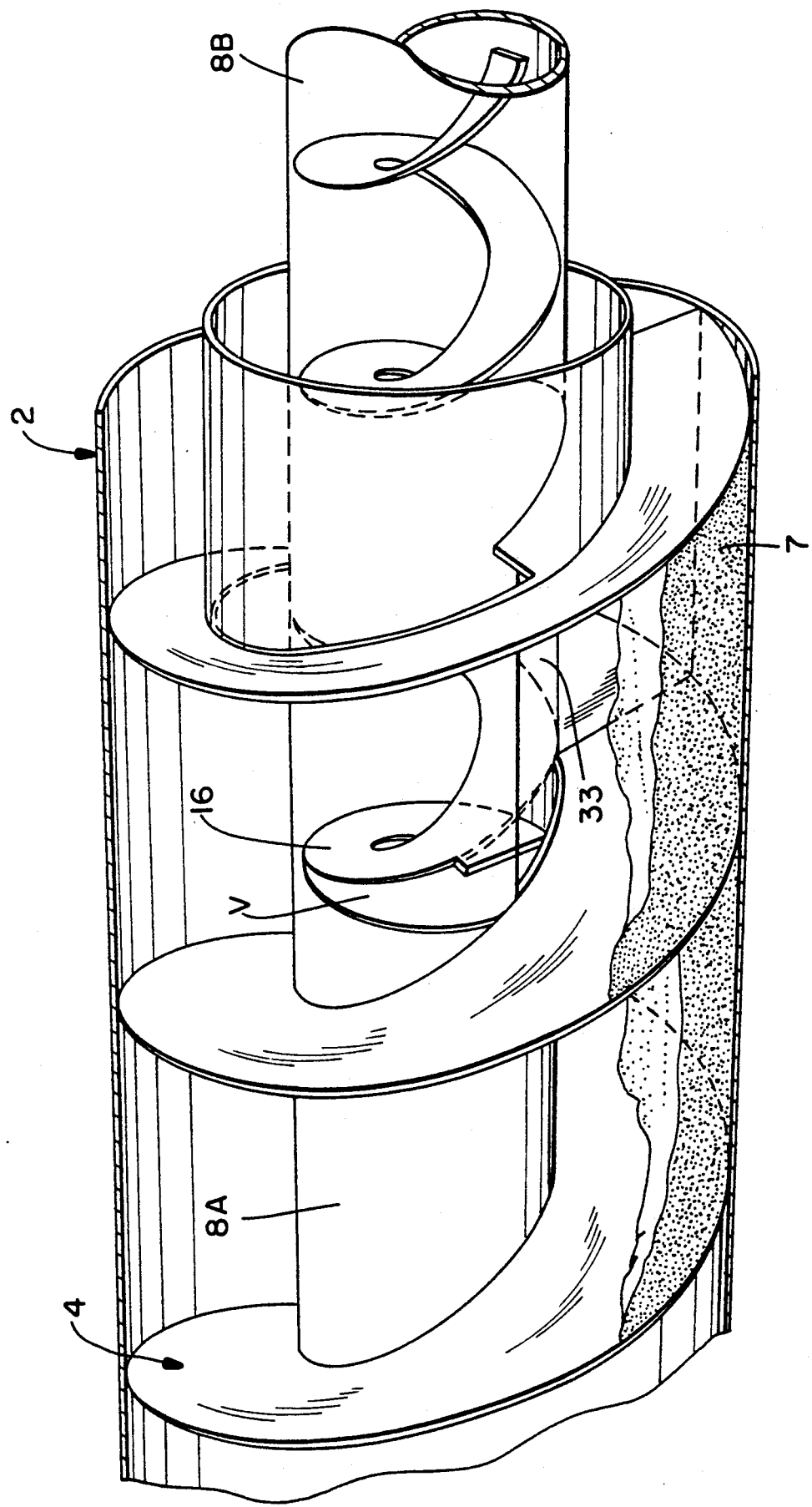
FIG. 5 shows the outlet arrangement in a first position.
Figure 6:
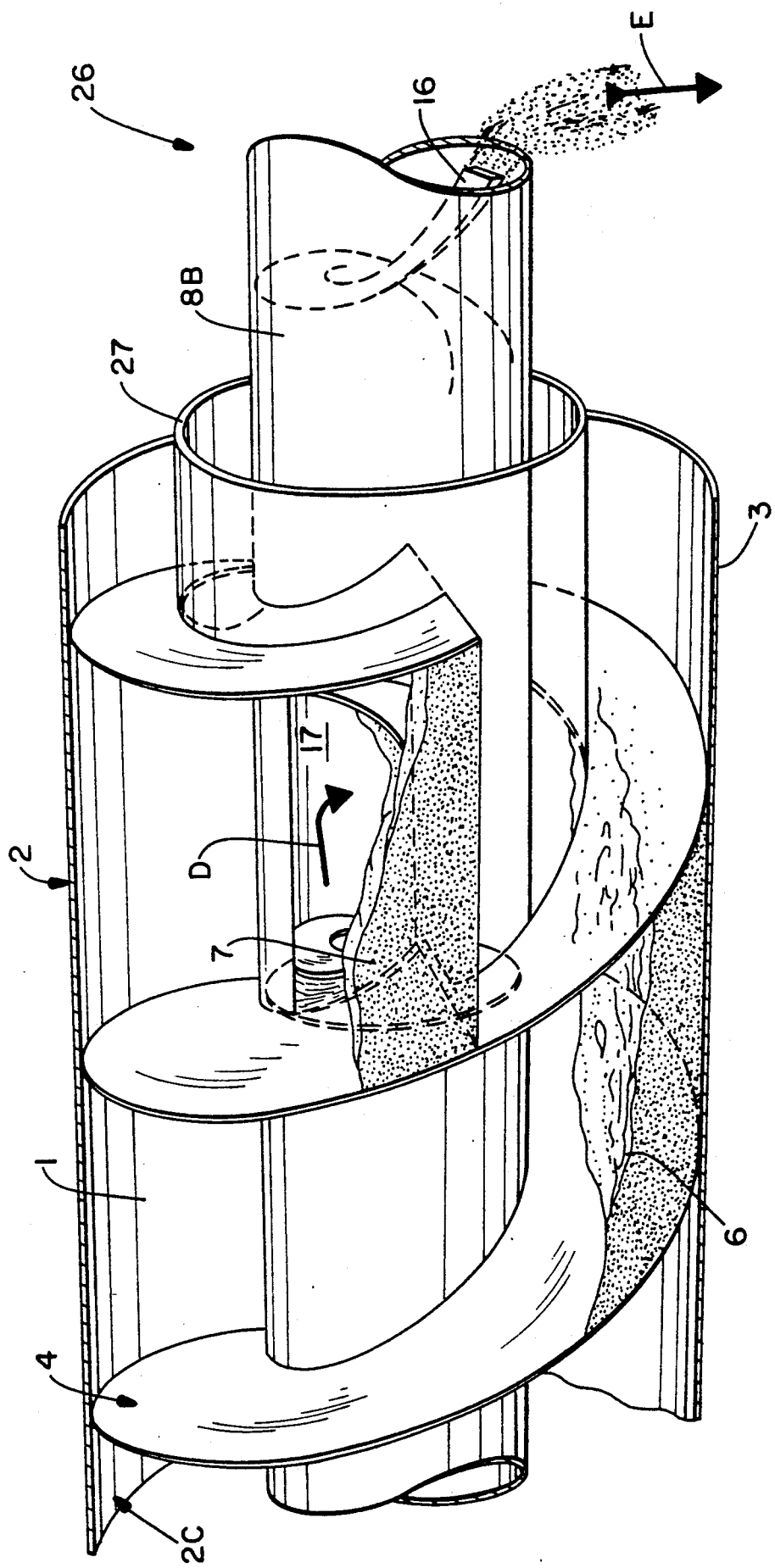
FIG. 6 shows the outlet arrangement in a second position.

Internally within a receiving space 1 in a rotating drum sieve 2, which comprises a drum casing 3 provided with a sieve opening and a feed screw 4 situated internally within the space 1, there is present an inlet 5, which is arranged for the supply of liquid 6 mixed with particles to said internal space 1, so that solid particles 7 shall be capable of being separated from said liquid 6 when the drum sieve is caused to rotate.

The inlet 5 consists of a part 8A of a pipe 8 extending internally within the drum 2 centrally along the length of the drum, which pipe also exhibits a number of supply openings 9-11 distributed along the longitudinal sense of the pipe and displaced in relation to one another around the circumference of the pipe, which openings are intended for the supply of liquid 6 mixed with particles to the internal receiving space 1 of the drum, at the same time as the drum 2 is caused to rotate, preferably in conjunction with said inlet 5. In this embodiment, the pipe and supply openings, the inlet, the drum casing, and the feed screw rotate together as one unit.

The rotating inlet 5 is capable of connection via a pipe seal T of an appropriate kind to an incoming line 5A, which is permanent and which consists, for example, of a rigidly supported pipe, conveniently being a pipe which is attached to a frame of the sieve arrangement.

At least one supply opening 9-11 extends from the internal space 12 of the inlet to each of the spaces 13-15 formed between parts 4A-4D of the screw 4 attached to the pipe 8 and the drum casing 3. The openings 9-11 are conveniently of slotted shape and extend in the longitudinal sense of the pipe and are displaced in relation to one another around the circumference of the pipe.

Arranged internally within the pipe 8 is a transverse wall V, which is so arranged as to restrict the flow of the liquid in the pipe 8 and to divide off said part 8A of the inlet from a further part 8B of the pipe 8, and which is so arranged as to constitute a removal component for at least solid sieved material 7.

A conveyor screw 16 or other similar conveyor devices can be situated within said partially internal space 17.

Said material conveyor screws 4 and 16 are conveniently rigidly attached to said pipe 8 externally and internally.

The pipe 8 extends preferably along the entire length of the drum, in conjunction with which a part 8A of the pipe 8 is intended for the material inlet and a further part 8B of the pipe 8 is intended for the removal of material from said drum 2.

The pipe 8 can extend outwards from the respective ends 2A, 2B of the drum as far as a storage component 18 and a drive arrangement 19 and a discharge component 20, in conjunction with which the drum sieve 2 with its accessories can be supported by a frame 21, on which bearing rollers 22 and a drive arrangement 19 are supported. Driving of the drum 2 can be effected by a friction, V-belt or geared drive, and cleaning of same can be effected by means of a rotating brush 23 and/or a water-jet arrangement 24 which operates with, for example, sieved water. A protective cover 25 can enclose the entire drum 2 for the purpose of, amongst other things, preventing the surrounding area from becoming saturated.

A preferred outlet 26 for the removal of at least solid sieved material 7 from the internal space 1 of the drum can be constituted by said rotating tubular part 8B extending outwards from the internal space 1 of the drum, but the outlet 26 preferably also comprises a spillway, which can be constituted by a tubular device 27 welded or in some other appropriate way attached to the feed screw 4 situated inside the drum 2 around, for example, ¾ of its circumference, so that the overflow water 28, which flows across to the space 29 which is situated beyond the screwed part 4D, can be led away via said spillway device 27 to a space 30 so as to be capable of being returned to the drum 2 for further sieving.

An outlet opening 31 extends from the internal space 1 of the drum to the internal material discharge space 17 of said outlet component, said outlet opening 31 preferably consisting of a slotted hole situated between the screw components 4D and 4E and extending in the longitudinal sense of the pipe and through the wall 32 of the pipe.

In order to permit the effective transfer of sieved material 7, which has been transported along the material receiving space 1 formed inside the sieve drum 2, by means of the conveyor screw 4 extending, for example, close along the internal surface 2C of the wall of the sieve drum and the external surface 8C of the pipe 8, and which is attached to same by, welding, for example, to the internal space 17 inside the material outlet component 8B, a shovel-like lifting device 33 is arranged inside said space 1. Said lifting device preferably consists of a piece of sheet metal, which extends between parts 4D, 4E of the conveyor screw in the screw 4 and along one edge 31A of the outlet opening 31. Said lifting device sheet 33 may extend, for example, radially or logarithmically helically outwards from the outlet component 8B.

The function of the arrangement is as follows: A liquid 6 mixed with particles, which is introduced in the direction of the arrow A into the inlet 5 via the fixed pipe 5A and the seal T, flows through the space 12 in the inlet 5 and is fed, as the pipe 8 is caused to rotate in the direction of the arrow B, into the material receiving space 1 of the drum via the openings 9-11, which are preferably displaced through 90° in relation to one another, in the direction of the arrows C. For example, if four such openings were disposed according to the above-mentioned arrangement, each 90° rotation of the pipe would place a different opening at the maximum discharge position. Liquid 34 drains away through the sieve openings 35 in the drum 2 and is collected in a trough 36 beneath the drum 2, whilst essentially solid sieved material 7 is transported further along the drum 2 with the help of the material conveyor screw 4, which can exhibit a desired number of inlets. Solid material 7 is taken and raised by means of the lifting device 33 and is transferred in the direction of the arrow D via the opening 31 to the internal space 17 of the outlet component 8B, and is discharged by means of the discharge screw 16 situated in said discharge component 8B in the direction of the arrow E via the discharge component 20, in order subsequently to be received appropriately in a container 37, the contents of which can then be processed.

Excess unsieved material 28 is fed via the spillway 27 as the occasion demands in the direction of the arrow F, so that it can be returned for further sieving in the arrangement.

The invention is not restricted to the illustrative embodiment described above and shown in the drawings, but may be modified within the scope of the Patent Claims without departing from the idea of invention.

I claim:

1. A rotatable drum sieve suitable for separating solids from a liquid/solid mixture, comprising:
   a drum casing having a first end, a second end, at least one sieve opening, and an internal casing space, said drum casing being rotatable about a longitudinal axis;
   a feed screw disposed within and attached to said drum casing, said feed screw constructed and arranged to supply the liquid/solid mixture to said internal casing space and to remove sieved solids from said internal casing space;
   a pipe longitudinally disposed within and attached to said feed screw, said pipe having an internal pipe volume, an inlet at a first end, an outlet at a second end, and a plurality of surface openings, at least one of said surface openings communicating said internal pipe volume with said internal casing space, said surface openings permitting the movement of the liquid/solid mixture to said internal casing space during rotation of said drum casing, said feed screw, and said pipe; and
   a shovel-like lifting device disposed on said feed screw, said lifting device constructed and arranged to transport sieved solids from said internal casing space to said outlet of said pipe.

2. A rotatable drum sieve according to claim 1, wherein said lifting device comprises a strip disposed longitudinally between and attached to two adjacent segments of said feed screw.

3. A rotatable drum sieve according to claim 2, wherein said strip extends radially outward from said pipe.

* * * * *